United States Patent

McGrew

[11] Patent Number: 5,897,690
[45] Date of Patent: Apr. 27, 1999

[54] VAPOR RECOVERY SYSTEM FOR HYDROCARBON STORAGE TANKS

[76] Inventor: Robert L. McGrew, P.O. Box 57, Carenero, La. 70520

[21] Appl. No.: 08/941,737

[22] Filed: Oct. 1, 1997

[51] Int. Cl.⁶ .................................................. B01D 47/06
[52] U.S. Cl. .............................. 95/188; 95/194; 95/228; 95/237; 95/288; 96/242; 96/266; 96/273; 96/322
[58] Field of Search ............................. 95/228, 229, 187, 95/188, 194, 206, 237, 238, 239, 240, 288; 96/242, 234, 250, 266, 271, 272, 273, 322, 328; 55/315.1, 315.2

[56] References Cited

U.S. PATENT DOCUMENTS

| | | | |
|---|---|---|---|
| 1,051,051 | 1/1913 | Zeckendorf | 15/288 |
| 2,758,665 | 8/1956 | Francis, Jr. | 96/181 |
| 3,778,968 | 12/1973 | Parker, Sr. | 95/206 |
| 3,778,969 | 12/1973 | Sudduth | 95/239 |
| 3,791,422 | 2/1974 | Johnson et al. | 95/288 |
| 4,102,983 | 7/1978 | Yamase et al. | 95/239 |
| 4,110,091 | 8/1978 | Daeschler et al. | 62/48.2 |
| 4,157,244 | 6/1979 | Gernhart et al. | 95/288 |
| 5,017,351 | 5/1991 | Rafson | 95/206 |
| 5,234,552 | 8/1993 | McGrew et al. | 203/18 |
| 5,255,735 | 10/1993 | Raghava et al. | 165/111 |
| 5,429,667 | 7/1995 | Ebner et al. | 95/187 |
| 5,431,715 | 7/1995 | Teague et al. | 95/67 |
| 5,512,084 | 4/1996 | Mauterer | 95/237 |
| 5,529,612 | 6/1996 | Troost | 95/228 |
| 5,618,333 | 4/1997 | Buckholz, Jr. et al. | 95/237 |
| 5,634,962 | 6/1997 | Trahan et al. | 95/240 |

FOREIGN PATENT DOCUMENTS

| | | | |
|---|---|---|---|
| 3827813 | 2/1990 | Germany . | |
| 53-90157 | 8/1978 | Japan . | |
| 63-159409 | 7/1988 | Japan | 95/228 |

Primary Examiner—Duane S. Smith
Attorney, Agent, or Firm—Richard C. Litman

[57] ABSTRACT

A vapor recovery system for hydrocarbon storage tanks captures VOCs (volatile organic compounds) which would otherwise escape to the atmosphere, thereby reducing pollutant emissions to the environment. The system includes a wash chamber, where the VOC vapors are sprayed with water at or below ambient temperature to condense the vapors from the air. The liquid hydrocarbons and water then drain downwardly into an accumulator. Due to the immiscibility of water and hydrocarbon fuels, particularly those having high aromatic content such as gasoline, the liquid VOCs are drained off and returned to the storage tank while the water is recycled for further spray cooling of vapors. The spray chamber is also surrounded by a coolant jacket, through which a coolant (water or other suitable liquid) below ambient temperature is circulated. This further reduces the temperature in the spray chamber, to condense additional VOCs and water from the air, as well as cooling the spray water. An additional spray chamber may be placed downstream of the accumulator, to capture any VOCs which may evaporate from the liquid hydrocarbons therein. The present system is vented to the atmosphere downstream of the accumulator and second spray chamber, but only minuscule amounts of VOCs escape to the atmosphere through the vent after passing through the present vapor recovery system.

18 Claims, 3 Drawing Sheets

VAPOR RECOVERY SYSTEM FOR HYDROCARBON STORAGE TANKS

BACKGROUND OF THE INVENTION

1. Field of the Invention

The present invention relates generally to systems for capturing and recovering vapors emitted from containers, and more specifically to a vapor recovery system for large, stationary hydrocarbon storage tanks, as used in the petroleum industry. The system provides for the cooling and condensing of the vapors by using water spray into the vapor recovery area, as well as a coolant jacket around the vapor recovery area.

2. Description of the Related Art

Increasing environmental awareness has led to the realization that many industrial products and processes may be potentially harmful to humans as well as to the environment. The recognition of the potential harmful effects of such processes and products has led to the establishment of the federal Environmental Protection Agency, as well as other federal and state agencies, in order to regulate and control such products and processes.

Perhaps the most prevalent example of the need for such control is in the petroleum industry, where it has been established that many petroleum products are not only toxic, but are also carcinogens. This is especially true of many of the lighter fractions of petroleum products, formed of relatively light weight molecules and having relatively high vapor pressures. In the past, such products were routinely vented to the atmosphere, in order to prevent the excessive buildup of pressure within the storage tanks, and possible rupture of the tanks and resulting fuel spills. The need to alleviate the pressure buildup within petroleum storage tanks still exists, however, even though the uncontrolled venting of hydrocarbon vapors into the atmosphere is generally prohibited now. Moreover, the release of hydrocarbon vapors and VOC (volatile organic compounds) into the atmosphere is quite wasteful of these finite resources, and recovery of these vapors has become increasingly important economically, as well as ecologically.

Accordingly, a need has been established for some means to capture and recover vapors from hydrocarbon and VOC storage tanks and the like. While various devices and systems have been developed in the past, they differ in various respects from the present invention. A discussion of the related art of which the present inventor is aware, and its differences and distinctions from the present invention, is presented immediately below.

U.S. Pat. No. 1,051,051 issued on Jan. 21, 1913 to Alois Zeckendorf describes a Process Of Regaining Alcohol From Air Passed Through Fermenting Vats Or The Like. Zeckendorf uses steam vapor to absorb the vaporous alcohol, with the steam and alcohol being cooled and condensed back to liquid form in a following step. However, Zeckendorf makes no provision for separating the condensed mixture into its water and alcohol components, stating that "the alcohol is not excessively diluted by water" (column 1, lines 46–47), yet it is well known that alcohol and water mix readily together and do not readily separate. Zeckendorf further teaches away from the present invention, by heating the water to form steam before spraying it into the alcohol vapors. The use of heated steam in the present invention, would raise the temperature at that point even higher, thus further increasing the vapor pressure of the VOCs and making them even more difficult to recover. The present invention uses water which has been chilled or is at least no higher than ambient temperature, to cool the vapors and reduce their vapor pressure for condensation back to liquid form. Moreover, the use of such a water (or other immiscible liquid) to cool the VOC vapors results in a liquid state for both substances, where the water and liquid hydrocarbons do not readily mix, but rather separate naturally for ease of further processing.

U.S. Pat. No. 2,758,665 issued on Aug. 14, 1956 to Alex W. Francis, Jr. describes Low Temperature Separation Systems for separating liquid hydrocarbon vapors from gases at the well stream. The "low temperature" used is from 60 to 90 degrees (column 4, line 74), in order to drive as much gas as possible from the liquid hydrocarbon fraction. This is considerably higher than temperatures used in the present invention. Moreover, since Francis, Jr. is separating substances directly from the well head, with its relatively high pressures, he cannot vent any of the system to ambient, as is done with the present system. Francis, Jr. also uses a desiccant (glycol, etc.) in his system, which is not required for recovery of hydrocarbon vapors using the present system.

U.S. Pat. No. 3,791,422 issued on Feb. 12, 1974 to Everette M. Johnson et al. describes a Service Station Gasoline Vapor Recovery System comprising a concentric vapor recovery line within a conventional fuel delivery hose. Vapors displaced from the automobile fuel tank are recovered and sent to a knockout chamber or cooling tower, where the vapors are condensed back to liquid form and sent back to the stationary storage tank via a one way valve. The system differs from the present invention, in that (1) no water or other coolant is injected into the vapor, (2) the vapor is returned to a different tank from that from which it escaped, and (3) the system is structured to act only intermittently and temporarily, with the fuel hose being removed from the vehicle fuel tank inlet between uses.

U.S. Pat. No. 4,110,091 issued on Aug. 29, 1978 to Werner Daeschler et al. describes a Process For The Separation Of A Gaseous Mixture Consisting Of Water Vapor, Hydrocarbons, And Air. The process is a closed system, with the gaseous mixture being compressed and then chilled a closed network of components, unlike the present system which is open to ambient pressure. Moreover, Daeschler et al. chill the gaseous mixture far below temperatures used in the present system, with the Daeschler et al. system reaching temperatures sufficiently low to cause the hydrocarbon fractions to solidify (column 1, lines 45–47, etc.). While the present system may use cooling agents other than water to cool the mixture below the freezing point of water, it is not considered desirable to cool the mixture below the freezing point of the hydrocarbons therein. Thus, Daeschler et al. teach away from the present system, which preferably uses water as the cooling agent, or at least a cooling agent which does not produce temperatures substantially below the freezing point of water. Moreover, the present system is structured to operate continually, while the Daeschler et al. system operates only intermittently on demand, somewhat like the Johnson et al. service station system discussed further above. Also, Daeschler et al. must provide supplemental heat for their system to remove water ice which has formed, and also provide for air to be passed through the system to assist in the evaporation and removal of ice therein. This is considerably different than the operation of the present vapor recovery system.

U.S. Pat. No. 5,234,552 issued on Aug. 10, 1993 to Robert McGrew et al. describes a Glycol Reboiler Vapor Condensor for recovering the glycol vapors from a moist hydrocarbon recovery system. This patent is generally directed to a system for recovering a mixture of gas and liquid hydrocarbons at the well, rather than recovering hydrocarbon vapors from a storage tank, where the hydrocarbons are essentially dehydrated. Such a system is described in U.S. Pat. No. 2,758,665 to Alex W. Francis, Jr., discussed further above. In such gas and hydrocarbon recovery, it is important to avoid or minimize any hydration of the gas fraction. Yet, in order to condense the liquid hydrocarbons to precipitate from the gas, it is generally necessary to cool the mixture below the water condensation point in the gas. Accordingly, glycol (or other desiccant) is added to the mixture to absorb water. The hydrated glycol must then be dehydrated, with the McGrew '552 patent disclosing a means of accomplishing such glycol dehydration. The cooling water temperature used is generally considerably higher than that used in the present invention, and no additional cooling of the coolant is provided in the '552 patent, whereas additional cooling of the water is a part of the system of the present invention. Also, the '552 patent provides for burning the released hydrocarbons to provide heat for the glycol reboiler, which heating is not a part of the present invention. The temperatures reached in the glycol reboiling operation can be as high as 400 degrees F., whereas no heating means or temperatures above ambient are provided in the system of the present invention.

U.S. Pat. No. 5,255,735 issued on Oct. 26, 1993 to Ram S. Raghava et al. describes a Fuel Vapor Recovery Device for automobile fuel tanks comprising an insulated catch container adapted to cool and condense fuel vapors within the fuel tank, and to return them to the tank in a liquid state. The device amounts to a small refrigeration unit, and is an entirely closed system, excepting the air vent to ambient which is only selectively and periodically opened. Moreover, while Raghava et al. state that the "device would operate continuously" (column 3, lines 45–46), this means only that continuous electrical power would be provided. The device is only intended to collect vapors during the warmer portion of the diurnal cycle and return them to the tank intermittently, as indicated in column 3, lines 24–34. The present system operates continually, and is continuously open to ambient conditions.

U.S. Pat. No. 5,429,667 issued on Jul. 4, 1995 to Karl Ebner et al. describes a Process For The Recovery Of Carbon Disulfide From A Steam/Carbon Disulfide Mixture. The system is closed, unlike the present system which is open to ambient conditions. The initial cooling water spray is preheated in a heat exchanger, which teaches away from the present system where water at ambient or lower temperature is used. It is not desirable to use heated water in the present system, as the addition of heat would tend to promote the formation of additional hydrocarbon vapors.

U.S. Pat. No. 5,431,715 issued on Jul. 11, 1995 to Beth O. Teague et al. describes a Process For Removing Emissions By Condensation And Precipitation, essentially comprising a heat exchanger for cooling the air and contaminate mixture to condense the contaminates into droplets, a liquid removal system, and another heat exchanger for reheating the air. The liquid removal system of the Teague patent relies upon principles such as electrostatic precipitation, filter pads, etc. Teague does not use cooling to separate the contaminates from the air, as is done in the present invention. Moreover, the present invention does not use any heating means anywhere in the system. The use of heat teaches away from the present invention, where heat is undesirable due to its effect in further vaporizing the hydrocarbons which are being condensed from the air. Also, the Teague system appears to be a closed system, unlike the present system which is open to ambient conditions.

Japanese Patent Publication No. 53-90157 published on Aug. 8, 1978 illustrates a system for treatment of waste gas containing another substance(s) therein. The English abstract indicates that the method comprises passing the gas through a heat exchanger, and presumably cooling the gas to condense the substance from the gas, to cause the substance to flow down the inner surface of the condenser. While this method bears some resemblance to that used in the present invention, it is not clear whether the system is closed or open to ambient conditions, as in the present invention, nor is any form of water or other liquid spray apparent for directly cooling the gas, as provided by the present invention.

Finally, German Patent Publication No. 3,827,813 published on Feb. 22, 1990 illustrates a means of condensing petrol (gasoline, i. e. hydrocarbon) vapor from waste gas. The system uses liquid nitrogen to cool an intermediate medium, which is in turn used to chill the waste gas and condense the hydrocarbon vapors therein. An additional step is required first to dry the waste gas or air and vapor mixture completely, as the temperatures of the process are well below the freezing point of water. This relatively complex system teaches away from the present invention, where water is injected into the hydrocarbon vapor to condense the vapor to a liquid state. This is not a problem, as light hydrocarbons (e. g., gasoline) do not mix readily with water and are easily separable in a collection tank.

None of the above inventions and patents, either singly or in combination, is seen to describe the instant invention as claimed.

SUMMARY OF THE INVENTION

The present invention comprises a vapor recovery system for the recovery of hydrocarbon vapors which would otherwise be allowed to escape to the atmosphere. Venting of such vapors is essential to prevent possible rupture of the storage tank due to the extremely high vapor pressure which can occur, particularly with relatively highly aromatic hydrocarbon fuels such as gasoline. However, it is also essential that the vapors be captured in order to avoid polluting the atmosphere in the vicinity.

Accordingly, the present invention provides a means of recovering such hydrocarbon vapors, and is particularly well adapted for use with stationary fuel storage tanks and the like, as commonly installed at refineries, tank farms, etc. The present system ducts the vented vapors from the storage tank to a condenser, where water at ambient temperature or lower is sprayed into and through the vapors of VOCs (volatile organic compounds). The VOC vapors are at least partially changed to a liquid state or phase, where they run downwardly to collect in an accumulator, along with the water which has been added to the liquid due to the spray. The water readily settles to the bottom of the accumulator for draining and recycling for further spray.

A second VOC condensation means is provided simultaneously with the above described spray by circulating a liquid (e. g., water) cooled below ambient temperature, through a coolant jacket surrounding the spray chamber. This water or other liquid is chilled through a cooling or refrigeration apparatus and recycled.

Any remaining VOC vapors are vented to the atmosphere in the present open system. It has been found that the above condensation process is capable of removing the vast majority of VOCs from the system, before reaching the atmosphere. An optional secondary water spray may be added to the vent downstream of the accumulator, if desired, to capture any small amount of VOCs still remaining in the vented air.

Accordingly, it is a principal object of the invention to provide an improved vapor recovery system for the recovery of volatile organic compounds which vent from hydrocarbon storage tanks and the like.

It is another object of the invention to provide an improved vapor recovery system which utilizes a water spray at or below ambient temperature, directly into the hydrocarbon vapors in a spray chamber, to condense the hydrocarbon vapors.

It is a further object of the invention to provide an improved vapor recovery system which collects the condensed hydrocarbon vapors and water spray in an accumulator where the immiscible water and hydrocarbons are separated, with the hydrocarbons being returned to the storage tank and the water being recycled for further spray use.

An additional object of the invention is to provide an improved vapor recovery system incorporating a coolant jacket around the spray chamber, to circulate chilled water or other liquid about the spray chamber in order to chill its contents below ambient.

Still another object of the invention is to provide an improved vapor recovery system which is open to the atmosphere, and which may incorporate a secondary spray chamber downstream of the accumulator, if desired, in order to capture further VOCs from the system prior to reaching the atmosphere.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention comprises a vapor recovery system for recovering volatile organic compound (VOC) vapors which would otherwise be vented into the atmosphere from storage tanks. The system 10, and a hydrocarbon or VOC storage tank 12 with which the present system 10 is used, is shown schematically in FIG. 1. The storage tank 12 includes a vent 14, which is normally vented to the atmosphere to release vapor pressure in the tank 12 to preclude bursting the tank 12 in the event the VOC vapors build to too great an extent. However, this release of VOC vapors into the atmosphere creates a pollution and emission problem, which must be resolved.

Figure 2:
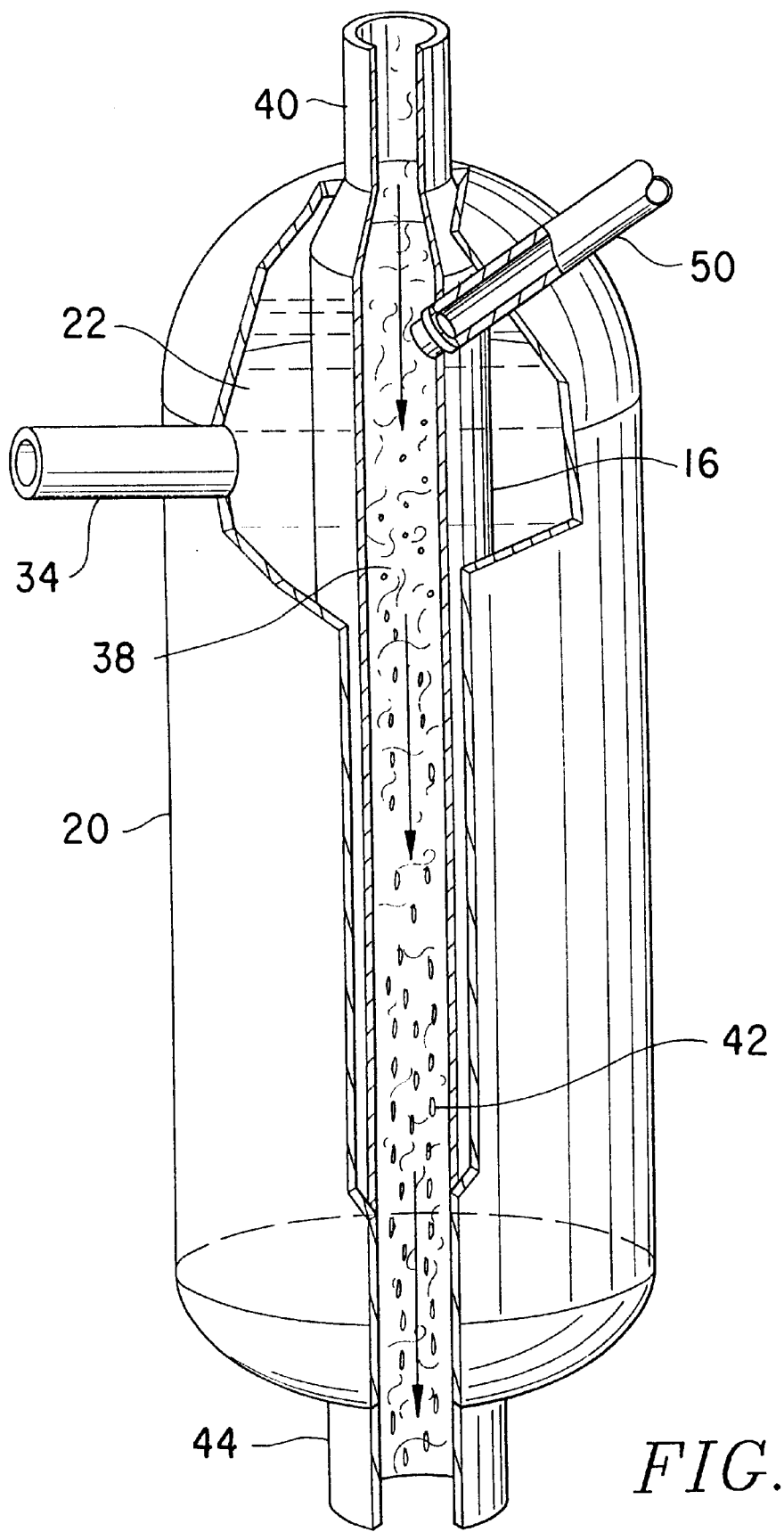
FIG. 2 is a detailed perspective view in section of a spray chamber and coolant jacket which may be incorporated with the present invention.

Accordingly, rather than the tank vent 14 venting directly to the atmosphere, the vent 14 is connected to a vapor recovery condenser chamber 16 through a flame arrestor 18. The vapor condenser 16 serves to receive VOC vapors from the tank 12 by means of the vent line 14, connecting the interior volume of the tank 12 and condenser 16 together. The condenser chamber 16 in turn is completely surrounded by a coolant jacket or shell 20, which contains and holds a first coolant 22 adjacent the inner chamber 16. The condenser 16 and its jacket 20 are shown in detail in FIG. 2.

The coolant 22 is circulated through a closed supply system, preferably incorporating a first coolant storage tank 24 and a cooling system 26 therefor. Preferably, this first coolant 22 is water, with the cooling system 26 being adjusted to cool the water 22 to a temperature between ambient and the freezing point of water.

Water or other coolant 22 is pumped through a supply line 28 and control valve 30 to an inlet port 32 on the condenser chamber coolant jacket 20, whereupon the coolant 22 circulates around the vapor condenser chamber 16 enclosed therein. The first coolant 22 is then returned to the first coolant supply tank 24 from the coolant jacket outlet port 34 and a return line 36. With the configuration shown, where the colder coolant 22 enters the lower end of the coolant jacket 20 and is somewhat warmed as it passes through the jacket 20 to the upper outlet port 34, a thermosiphon effect may be used to circulate the coolant 22. However, a conventional mechanical pump means (not shown) may also be used if so desired, depending upon the specific routing of the coolant lines, etc.

VOCs in vapor form 38 enter the vapor condenser chamber 16 at the upper vapor inlet port 40 thereof, and are cooled and condensed to a liquid state 42 as they pass through the relatively cool chamber 16 due to the first coolant 22 being circulated therearound within the surrounding coolant jacket 20. The liquid hydrocarbons 42 gravitate to the bottom end of the chamber 16, where they flow downwardly from the chamber outlet port 44 to a vapor recovery accumulator 46.

Figure 1:
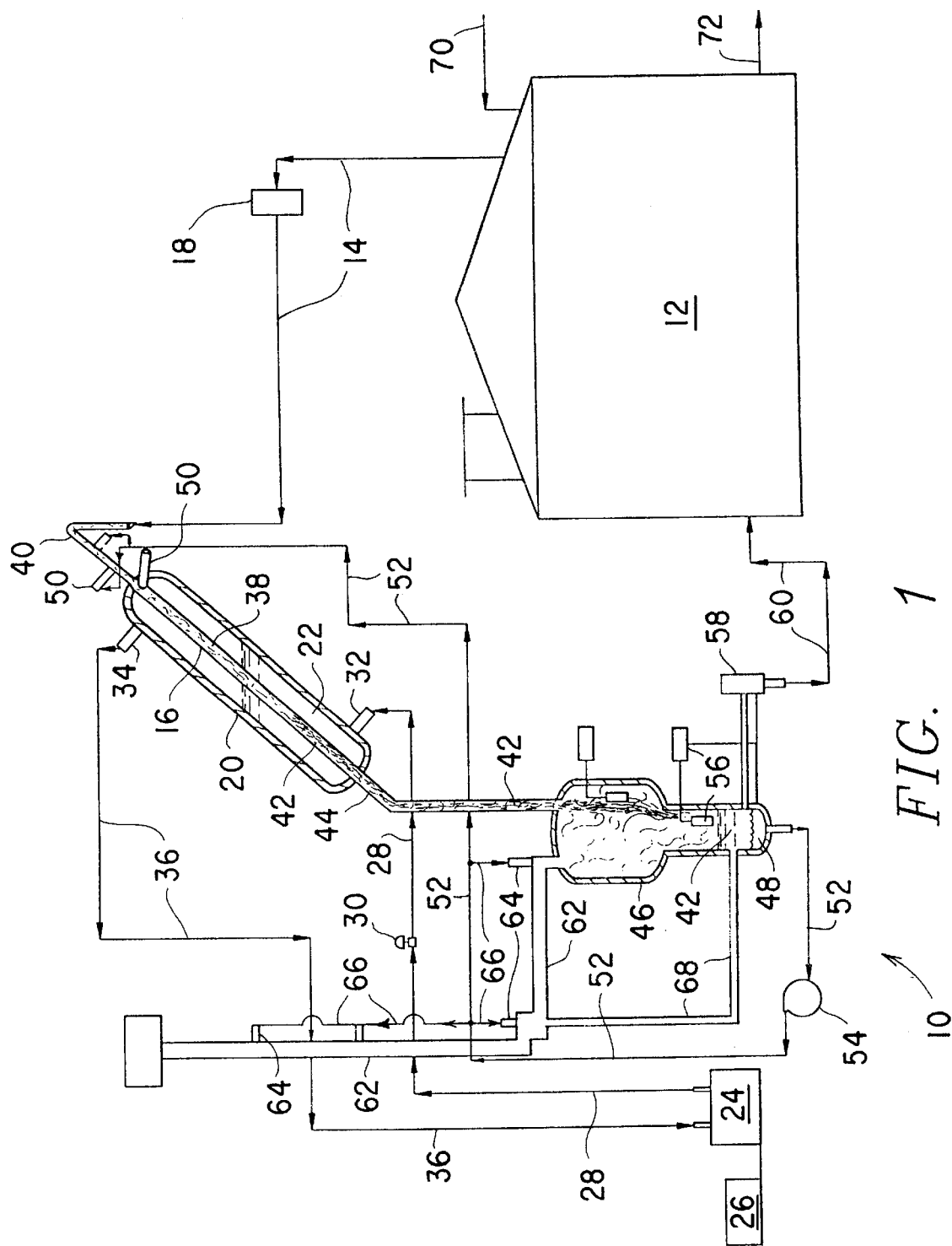
FIG. 1 is a schematic diagram of the present vapor recovery system, showing its general structure and components and their relationship to one another.

The accumulator 46 not only collects condensed, liquified hydrocarbons or VOCs, but also serves as a coolant collection and storage chamber for a second coolant 48, shown in the bottom of the accumulator 46 in FIG. 1. The second coolant 48 must be an immiscible fluid, which is incapable of mixing with the liquid VOCs or hydrocarbons 42 which flow from the condenser chamber 16. Water also works well as this second coolant fluid 48. The second coolant 48 is sprayed directly into the condenser chamber 16 by one or more primary injector nozzles 50, which deliver the second coolant 48 into the chamber 16 in the form of a fine mist where its evaporation serves to cool the vaporous VOCs 38 further. (While only a single injector nozzle 50 is shown in the detail view of FIG. 2, it should be noted that one or more such nozzles may be used. It will be noted that there are three such nozzles 50 shown in the schematic view of FIG. 1.)

The second coolant 48 is delivered to the primary (chamber) nozzles 50 by means of delivery line(s) 52 and a pump 54 of suitable pressure and capacity. The second coolant 48 is also cooled to a certain extent due to the chilling of the chamber 16 by the first coolant 22 delivered by the closed circuit first coolant system 24 and 26, whereupon it condenses back to a liquid state and precipitates to the bottom of the condenser chamber 16 to flow downward from the chamber outlet port 44 into the accumulator 46 to be recycled for further cooling spray of the chamber 16 interior. Monitoring of the relative levels of the second coolant 48 and condensed VOC 42 levels within the accumulator 46 is accomplished by means of a level controller float mechanism 56 within the accumulator 46. The condensed, liquified VOC or hydrocarbon fluid 42 is returned to the storage tank 12 by means of a return pump 58 and return line 60.

The above described VOC or hydrocarbon vapor recovery system 10 is capable of removing the vast majority of such vapors from the air. Accordingly, the accumulator 46 is vented to the atmosphere by an accumulator vent 62, with the system consequently receiving essentially ambient pressure internally throughout, to preclude excessive internal pressures in the tank 12. However, further recovery of any vapors which may escape from the accumulator 46 may be achieved by installing further coolant spray secondary nozzles 64 at one or more points along the accumulator vent 62, as shown in FIG. 1. Branch lines 66 may be routed from the primary injector lines 52, to supply coolant 48 to the secondary injector nozzles 64. Condensed VOCs drain downwardly back along the accumulator vent line 62 to a vent drain 68, to return to the accumulator 46. As the present system 10 is open to the atmosphere, it will be seen that over some period of time that the secondary coolant 48 in such an open system, will evaporate. Accordingly, additional secondary coolant 48 may be added as required in accordance with the monitoring means of the level controller 56 noted further above.

Figure 3:
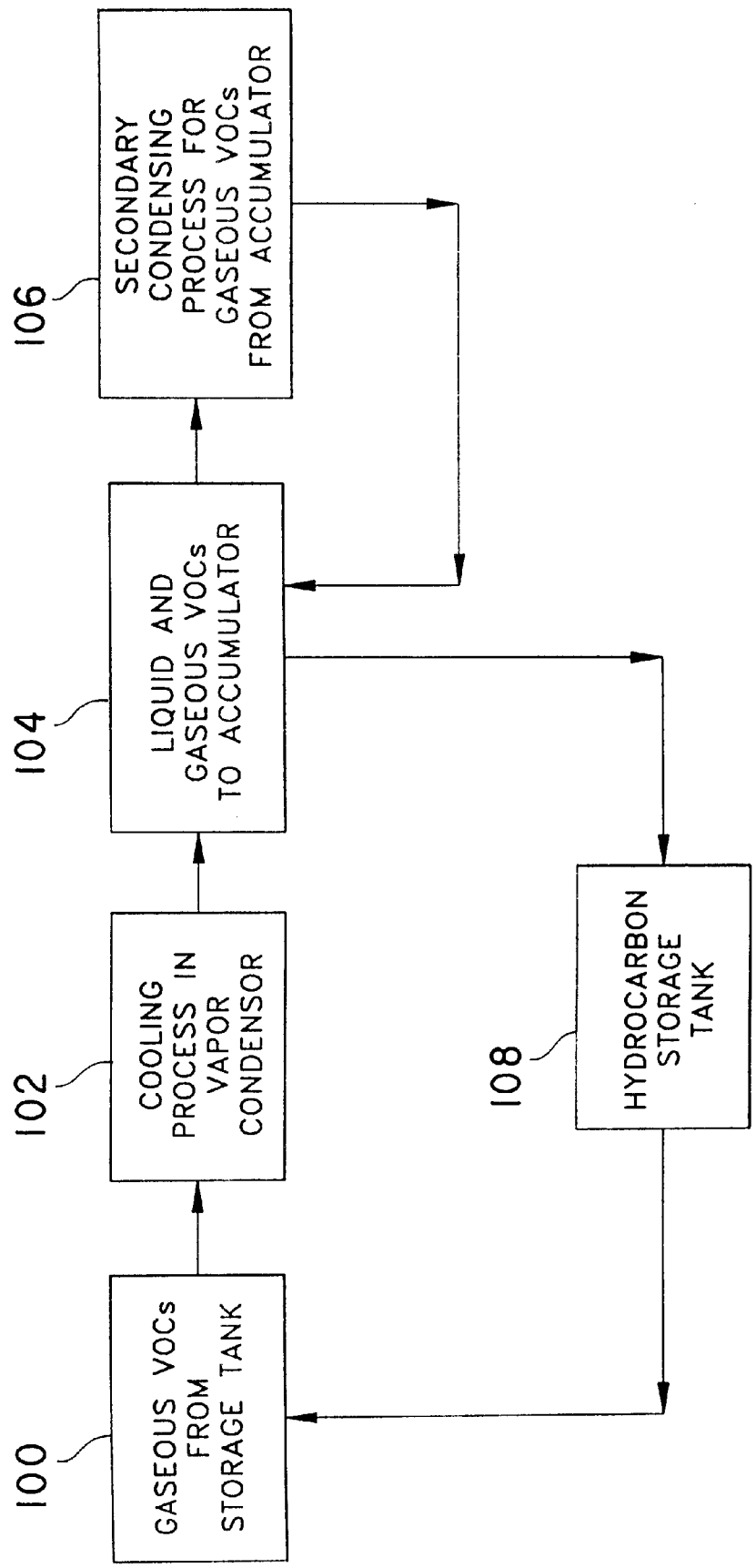
FIG. 3 is a block diagram or flow chart, illustrating the steps in the method of recapturing VOC vapors using the present invention.

The present vapor recovery system 10 is used generally in accordance with the block diagram or flow chart shown in FIG. 3 of the drawings. VOCs (volatile organic compounds, with hydrocarbons, particularly lighter hydrocarbons with high aromatic content, such as gasoline, being examples) change state from a liquid to a gas within the enclosed storage tank 12, and escape by means of the vent 14 to the vapor condenser 16, as generally indicated by the first step 100 in FIG. 3.

The gaseous VOC vapors 38 are then cooled and condensed within the condenser 16, by means of the primary (closed system) coolant 24 and coolant jacket 20, and the secondary (open or evaporative system) coolant 48 and associated primary spray nozzles 50 of the condenser chamber 16, as indicated by the second step 102 in FIG. 3.

Once the gases have been cooled and (at least mostly) condensed to liquid form, they will flow downwardly due to gravity to collect in the accumulator 46, as indicated in the third step 104 of FIG. 3. (It will be seen that any slight fraction of VOCs in a gaseous state will also be washed downwardly into the accumulator 46, due to the action of the second coolant 48.) When water is used as the second coolant 48, it will not mix with hydrocarbons of relatively light molecular weight, such as gasoline and the like, and will settle at the bottom of the accumulator below the level of the condensed VOCS, where it may be recycled for further use. It should also be noted that the temperature of this second coolant 48 will be at least slightly lower than ambient, due to (1) the release of heat due to evaporation as the coolant 48 is sprayed into the condenser 16, and (2) the transfer of heat to the relatively cold walls of the condenser 16 due to the preferably chilled first coolant 24 flowing through the coolant jacket 20 surrounding the vapor condenser 16. If desired, this secondary coolant 48 could be routed through the cooling system 26, or a separate cooling system, in order to chill the coolant 48 immediately prior to its injection into the condenser 16.

At this point, the condensed and liquified hydrocarbons are returned to the storage tank 12 by means of the return line 60 and pump 58, as indicated in the fourth step 106 of FIG. 3.

As the accumulator 46 is vented to the atmosphere by the accumulator vent 62, it is possible that some slight amount of VOC vapors may escape through the vent 62. The present system 10 is generally capable of recovering the vast majority of such vapors before they escape, and meets most current standards for vapor recovery and for reducing VOC emissions to the atmosphere. However, further vapor recovery may be achieved for the small fraction of VOCs in the accumulator vent line 62, by providing additional secondary coolant spray nozzles 64 to spray coolant 48 into the vent line 62, if desired. (It will be seen that a coolant jacket, similar to the coolant jacket 20 surrounding the condenser 16, could also be provided about the vent line 62 if so desired, for further cooling of any gases within the line 62.) This secondary condensing process is indicated generally by the fifth step 108 of FIG. 3, with condensed and liquified VOCs being returned to the accumulator 46 for subsequent return to the tank 12.

In summary, the present vapor recovery system for hydrocarbon storage tanks will be seen to provide a significant advance in efficiency and economy over earlier systems of the related art. The present system is extremely economical to use, with the only power requirements being a relatively small cooling plant for cooling the primary coolant which is circulated through the coolant jacket surrounding the condenser, and a few relatively small pumps for circulating and injecting the first and second coolants, and for returning condensed and liquified VOCs to the storage tank. Yet, it will be seen that the present system may even accommodate more than a single storage tank, by means of interconnecting inlet and outlet lines 70 and 72. The economy of the present system is further realized when the amount of recovered VOCs is considered. These VOCs would otherwise be lost to the atmosphere, whereas the present system provides for their recovery and subsequent sale in liquified form.

The present system is structured to provide for removing VOCs from tank vent systems in accordance with OSHA Regulations, specifically 29 CFR Part 1910, which states that no more than one part per million (ppm) of benzine (a toxin and carcinogen) is permitted in occupational exposure. The present system meets or exceeds this and other standards, and will be seen to provide a significant improvement in air quality.

It is to be understood that the present invention is not limited to the sole embodiments described above, but encompasses any and all embodiments within the scope of the following claims.

I claim:

1. A vapor recovery system for recovering volatile organic compounds emitted from a storage tank having a vent, comprising:

a condenser chamber communicating with the tank vent;

said chamber including a surrounding coolant jacket;

a closed coolant supply system containing a first coolant at a temperature no higher than ambient, with said coolant supply system circulating said first coolant through said coolant jacket of said chamber;

an accumulator communicating with said condenser chamber for collecting and containing condensed volatile organic compounds therefrom;

said accumulator further containing an immiscible second coolant at a temperature no higher than ambient, for circulating through said condenser chamber;

at least one coolant spray primary nozzle communicating with said condenser chamber and with said accumulator, for spraying said second coolant directly into said condenser chamber for cooling and condensing volatile organic compound vapors therein to a liquid state;

a return system connecting said accumulator to the storage tank, for returning condensed volatile organic compounds from said accumulator to the storage tank; and an accumulator vent open to the atmosphere, for continually venting said accumulator to the ambient atmosphere.

2. The vapor recovery system according to claim 1, including a cooling system for chilling said first coolant.

3. The vapor recovery system according to claim 2, wherein said first coolant is water, chilled to a temperature between ambient and the freezing point of water.

4. The vapor recovery system according to claim 2, wherein said second coolant is water, chilled to a temperature below ambient by contact with said condenser surrounded by said coolant jacket containing said chilled first coolant.

5. The vapor recovery system according to claim 1, wherein said second coolant is water.

6. The vapor recovery system according to claim 1, including at least one coolant spray secondary nozzle communicating with said accumulator vent, for spraying said first coolant into said accumulator vent for cooling and condensing volatile organic compound vapors therein to a liquid state for returning to said accumulator.

7. A hydrocarbon storage facility and a vapor recovery system for recovering volatile organic compounds emitted therefrom, comprising in combination:

a storage tank including a vent;

a vapor condenser chamber communicating with said vent;

said chamber including a surrounding coolant jacket;

a closed vapor recovery coolant supply system containing a first coolant at a temperature no higher than ambient, with said coolant supply system circulating said first coolant through said coolant jacket of said chamber;

a vapor recovery accumulator communicating with said condenser chamber for collecting and containing condensed volatile organic compounds therefrom;

said accumulator further containing an immiscible second coolant at a temperature no higher than ambient, for circulating through said condenser chamber;

at least one vapor recovery coolant spray primary nozzle communicating with said condenser chamber and with said accumulator, for spraying said second coolant directly into said condenser chamber for cooling and condensing volatile organic compound vapors therein to a liquid state;

a return system connecting said accumulator to said storage tank, for returning condensed volatile organic compounds from said accumulator to said storage tank; and a vapor recovery accumulator vent open to the atmosphere, for continually venting said accumulator to the ambient atmosphere.

8. The storage facility and vapor recovery system combination according to claim 7, including a cooling system for chilling said first coolant.

9. The storage facility and vapor recovery system combination according to claim 8, wherein said first coolant is water, chilled to a temperature between ambient and the freezing point of water.

10. The storage facility and vapor recovery system combination according to claim 8, wherein said second coolant is water, chilled to a temperature below ambient by contact with said condenser surrounded by said coolant jacket containing said chilled first coolant.

11. The storage facility and vapor recovery system combination according to claim 7, wherein said second coolant is water.

12. The storage facility and vapor recovery system combination according to claim 7, including at least one coolant spray secondary nozzle communicating with said accumulator vent, for spraying said first coolant into said accumulator vent for cooling and condensing volatile organic compound vapors therein to a liquid state for returning to said accumulator.

13. A method of recovering volatile organic compound vapors emitted from a storage tank having a vent, comprising the following steps:

(a) providing a condenser chamber communicating with the tank vent, a coolant jacket surrounding the condenser chamber, and at least one coolant spray primary nozzle communicating with the condenser chamber;

(b) further providing a closed coolant supply system containing a first coolant at a temperature no higher than ambient, communicating with the coolant jacket;

(c) further providing an accumulator containing an immiscible second coolant at a temperature no higher than ambient, and communicating with the at least one nozzle of the condenser chamber;

(d) further providing a return system connecting the accumulator to the storage tank, and an accumulator vent open to the atmosphere;

(e) spraying the second coolant into the condenser chamber and condensing volatile organic compounds therein to a liquid state thereby;

(f) cooling the condenser chamber to a temperature below ambient by means of the first coolant, and thereby further condensing volatile organic compounds therein;

(g) collecting liquified volatile organic compounds and second coolant in the accumulator;

(h) returning the liquified volatile organic compounds to the storage tank, and recycling the second coolant for spraying into the condenser chamber; and (i) venting the accumulator to the ambient atmosphere.

14. The method of claim 13, including the steps of:

(a) providing a cooling system; and (b) chilling the first coolant using the cooling system.

15. The method of claim 14, including the steps of:

(a) using water as the first coolant; and (b) chilling the water to a temperature between ambient and the freezing point of water.

16. The method of claim 14, including the steps of:

(a) using water as the second coolant; and (b) chilling the water to a temperature below ambient by contact with the condenser surrounded by the coolant jacket containing the chilled first coolant.

17. The method of claim 13, including the step of using water as the second coolant.

18. The method of claim 13, including the steps of:

(a) providing at least one coolant spray secondary nozzle communicating with the accumulator vent; and (b) spraying the second coolant into the accumulator vent and cooling and condensing the volatile organic compound vapors therein to a liquid state; and (c) returning the liquified volatile organic compound vapors to the accumulator.

* * * * *